US011354793B2

(12) United States Patent
Xu et al.

(10) Patent No.: US 11,354,793 B2
(45) Date of Patent: Jun. 7, 2022

(54) OBJECT DETECTION WITH MISSING ANNOTATIONS IN VISUAL INSPECTION

(71) Applicant: International Business Machines Corporation, Armonk, NY (US)

(72) Inventors: Jian Xu, Shanghai (CN); Guo Qiang Hu, Shanghai (CN); Fan Li, Shanghai (CN); Sheng Nan Zhu, Shanghai (CN); Jinfeng Li, Beijing (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 16/715,106

(22) Filed: Dec. 16, 2019

(65) Prior Publication Data
US 2021/0183038 A1      Jun. 17, 2021

(51) Int. Cl.
*G06T 7/00* (2017.01)
*G06K 9/62* (2022.01)

(52) U.S. Cl.
CPC .......... *G06T 7/0002* (2013.01); *G06K 9/6267* (2013.01); *G06T 2207/20081* (2013.01); *G06T 2207/30168* (2013.01)

(58) Field of Classification Search
CPC .. G06K 9/6267; G06Q 10/06; G06Q 10/0631; G06Q 10/1097; G06Q 10/20; G06Q 50/28; G06T 2207/20081; G06T 2207/30168; G06T 7/0002
See application file for complete search history.

(56) References Cited

U.S. PATENT DOCUMENTS

| 9,031,317 | B2 | 5/2015 | Yakubovich et al. |
| 10,209,628 | B2 | 2/2019 | Uppaluri et al. |
| 10,755,228 | B1* | 8/2020 | Hasan ....................... G06T 7/90 |
| 2017/0177997 | A1* | 6/2017 | Karlinsky ............ G06N 3/0454 |
| 2019/0073568 | A1 | 3/2019 | He et al. |

OTHER PUBLICATIONS

Akram et al., "Leveraging Unlabeled Whole-Slide-Images for Mitosis Detection", arXiv.org, arXiv:1807.11677v1, Jul. 31, 2018, 8 pages, <https://arxiv.org/pdf/1807.11677.pdf>.

Deka, Partha, "Quality Inspection In Manufacturing Using Deep Learning Based Computer Vision: Improving Yield By Removing Bad Quality Material With Image Recognition", Towards Data Science, Dec. 18, 2018, 3 pages, <https://towardsdatascience.com/quality-inspection-in-manufacturing-using-deep-learning-based-computer-vision-daa3f8f74f45>.

(Continued)

*Primary Examiner* — Manuchehr Rahmjoo
(74) *Attorney, Agent, or Firm* — Sonny Z. Zhan (57) ABSTRACT

In an approach for object detection with missing annotations under visual inspection, a processor receives an image. A processor classifies the image being a not-good image using a pre-trained classifier. A not-good image means one or more defect objects being in the image. A processor, in response to classifying the image being the not-good image, detects the one or more defect objects in the not-good image. A processor masks the one or more defect objects in the not-good image. A processor inputs the masked image to train a detector.

17 Claims, 7 Drawing Sheets

(56) References Cited

OTHER PUBLICATIONS

Xu, Mengmeng, "Object Detection Using Multiple Level Annotations", In Partial Fulfillment of the Requirements For the Degree of Masters of Science, King Abdullah University of Science and Technology, Thuwal, Kingdom of Saudi Arabia, Apr. 2019, 73 pages, <https://repository.kaust.edu.sa/bitstream/handle/10754/631958/MengMeng_Xu_MS_thesis_Apr19.pdf?sequence=10&isAllowed=y>.

Yan et al., "Weakly- and Semi-Supervised Object Detection with Expectation-Maximization Algorithm", arXiv.org, arXiv:1702.08740v1, Feb. 28, 2017, 9 pages, <https://arxiv.org/pdf/1702.08740.pdf>.

Zhang et al., "Beyond Weakly-Supervised: Pseudo Ground Truths Mining for Missing Bounding-Boxes Object Detection", IEEE Transactions on Circuits and Systems for Video Technology, Feb. 11, 2019, 10 pages, <https://ieeexplore.ieee.org/abstract/document/8638807>.

* cited by examiner

OBJECT DETECTION WITH MISSING ANNOTATIONS IN VISUAL INSPECTION

BACKGROUND

The present disclosure relates generally to the field of computer vision, and more particularly to object detection with missing annotations in visual inspection.

Object detection is a computer technology related to computer vision and image processing that deals with detecting instances of semantic objects of a certain class in digital images and videos. Object detection aims to localize the position of each instance and classify the category of each target object. Object detection is a vital step towards many real-world applications, like image retrieval, product quality inspection etc.

SUMMARY

Aspects of an embodiment of the present disclosure disclose an approach for object detection with missing annotations under visual inspection. A processor receives an image. A processor classifies the image being a not-good image using a pre-trained classifier. A not-good image means one or more defect objects being in the image. A processor, in response to classifying the image being the not-good image, detects the one or more defect objects in the not-good image. A processor masks the one or more defect objects in the not-good image. A processor inputs the masked image to train a detector.

DETAILED DESCRIPTION

The present disclosure is directed to systems and methods for object detection with missing annotations in visual inspection.

Object detection is an important and fundamental task in computer vision, which aims to localize the position of each instance and classify the category of each target object. Object detection is a vital step towards many real-world applications, like image retrieval, product quality inspection, etc. Object detection methods may be based on fully-supervised learning methods, which usually train detection networks on large scale benchmarks with instance-level annotations (e.g., bounding boxes). A key factor to the performance of the fully-supervised learning methods is the strong learning ability of the fully-supervised deep convolutional neural networks and the availability of large scale labeled datasets with tight bounding-box annotations. Object detection may utilize weakly-supervised learning methods to train a weakly-supervised detector under the supervision of image-level. Weakly-supervised learning methods may learn classification and localization information from image-level labels, and do not need bounding box annotations. Weakly-supervised learning methods may build a large-scale benchmark with only image-level labels than to compile one with the accurate bounding box annotations. An embodiment of the present disclosure recognizes a shortcoming of the fully-supervised learning methods is that the fully-supervised learning methods require the accurate instance-level annotation for each object, which is expensive and time-consuming to obtain. An embodiment of the present disclosure also recognizes that a shortcoming of unsatisfactory performance of a weakly-supervised detector hinders the application of weakly-supervised detectors in some practical scenarios.

An embodiment of the present disclosure discloses systems and methods for object detection supervised under the partially labeled data as a missing bounding box object detection problem. An embodiment of the present disclosure discloses automatically finding the missing bounding boxes for the unlabeled instances in the images for visual inspection. An embodiment of the present disclosure recognizes that, in the visual inspection such as for a product quality inspection, it is difficult to perform manual inspection for defects, which is often expensive and time-consuming. An embodiment of the present disclosure discloses systems and methods that prepare training data and train a robust detector to detect defect objects in images for visual inspection. In an example of defect object detection for manufacturing, partial defect objects may be marked with bounding boxes in images for visual inspection. However, some bounding boxes for annotations may be missed for some defect objects in the images for visual inspection. An embodiment of the present disclosure recognizes that the missing annotations can cause a learning detector to mistakenly learn the defect objects as normal. An embodiment of the present disclosure discloses systems and methods that can effectively solve the problem of missing part of defect object annotations. In one or more embodiments, the systems and methods may reduce labor work and enhance data collection and data preprocessing.

In one or more embodiments, the systems and methods may automatically detect the defect objects of missing annotations in an image for visual inspection. The systems and methods may train and utilize a classifier for classifying images for visual inspection to be a good, or a not-good (with defect objects), image to avoid a risk of false positive of a not-good image. The systems and methods may train an object detector by inputting images with pseudo labels or erased or covered defect objects for the missing annotations to improve the performance and accuracy of the object detector.

Figure 1:
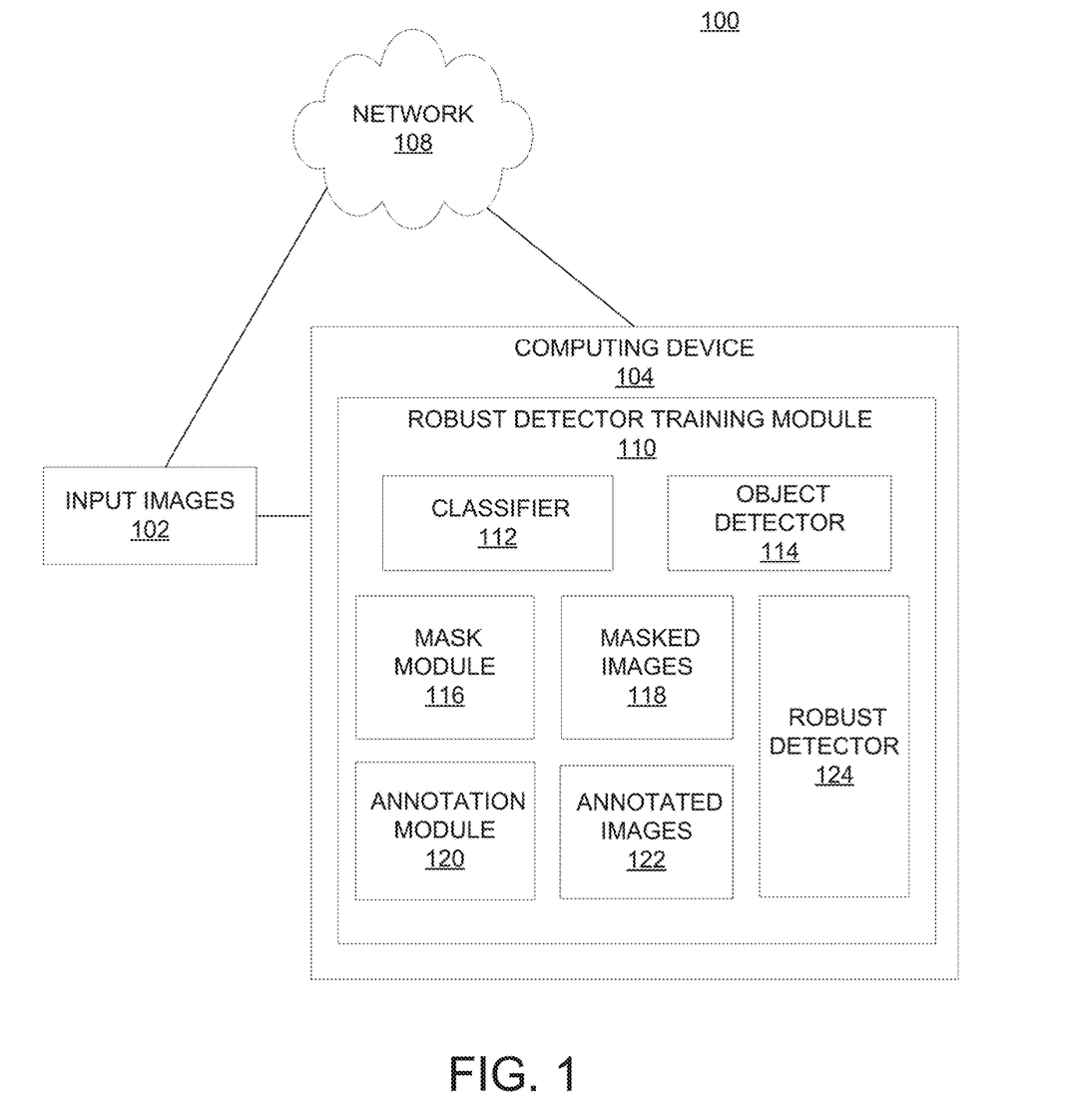
FIG. 1 is a functional block diagram illustrating a robust object detector training environment, in accordance with an embodiment of the present disclosure.

The present disclosure will now be described in detail with reference to the Figures. FIG. 1 is a functional block diagram illustrating a robust object detector training environment, generally designated 100, in accordance with an embodiment of the present disclosure.

In the depicted embodiment, robust object detector training environment 100 includes input images 102, computing device 104, and network 108. Input images 102 may be accessed through network 108 or accessed directly by computing device 104. In an example, input images 102 are images taken for an industrial quality inspection, for example, for a product inspection. Input images 102 may be labeled in image-level to indicate input images 102 are good or not-good images. A good image means there is no defect object in the image from the visual inspection. A not-good image means one or more defect objects are in the image from the visual inspection. A not-good image may include one or more bounding boxes (e.g., annotations) to indicate the locations of the one or more defect objects. In an example, every defect object in the not-good image has a corresponding bounding box to indicate the location of the defect object. In another example, there is no bounding box marked for any defect object in the not-good image. In yet another example, some bounding boxes are missed for some defect objects in the not-good image.

In various embodiments of the present disclosure, computing device 104 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 104 represents a computing system utilizing clustered computers and components to act as a single pool of seamless resources. In other embodiments, computing device 104 may represent a server computing system utilizing multiple computers as a server system, such as in a cloud computing environment. In general, computing device 104 can be any computing device or a combination of devices with access to robust detector training module 110 and network 108 and is capable of processing program instructions and executing robust detector training module 110, in accordance with an embodiment of the present disclosure. Computing device 104 may include internal and external hardware components, as depicted and described in further detail with respect to FIG. 7.

Further, in the depicted embodiment, computing device 104 includes robust detector training module 110. In the depicted embodiment, robust detector training module 110 is located on computing device 104. However, in other embodiments, robust detector training module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 104 and robust detector training module 110, in accordance with a desired embodiment of the disclosure.

In one or more embodiments, robust detector training module 110 is configured to receive input images 102. In an example, input images 102 are images taken for an industrial quality inspection, for example, for a product quality inspection. Input images 102 may be labeled in image-level to indicate input images 102 are good or not-good images. A good image means there is no defect object in the image from the visual inspection. A not-good image means one or more defect objects are in the image from the visual inspection. A not-good image may include one or more bounding boxes (e.g., annotations) to indicate the locations of the one or more defect objects. In an example, every defect object in the not-good image has a corresponding bounding box to indicate the location of the defect object. In another example, there is no bounding box marked for any defect object in the not-good image. In yet another example, some bounding boxes are missed for some defect objects in the not-good image.

In one or more embodiments, robust detector training module 110 includes classifier 112. Robust detector training module 110 is configured to utilize classifier 112 to classify input images 102 as being good or not-good images. A good image means there is no defect object in the image from the visual inspection. A not-good image means one or more defect objects are in the image from the visual inspection. In an example, robust detector training module 110 is configured to train classifier 112 for classifying an image for visual inspection to be a good or not-good (i.e., with one or more defect objects) image. In another example, classifier 112 is a pre-trained classifier that may classify an image for visual inspection to be a good or not-good (i.e., with one or more defect objects) image. Classifier 112 may be trained by using neural network techniques and deep convolutional neural networks.

In one or more embodiments, robust detector training module 110 includes object detector 114. Robust detector training module 110 is configured to use object detector 114 to detect defect objects in a not-good image that is classified by classifier 112. In an example, object detector 114 is a pre-trained object detector that may detect defect objects in a not-good image that is classified by classifier 112. In another example, robust detector training module 110 is configured to train object detector 114 for detecting defect objects in a not-good image that is classified by classifier 112. In an example, object detector 114 may be trained with weakly supervised learning methods with image-level annotations. In another example, object detector 114 may be trained with machine learning-based approaches. In yet another example, object detector 114 may be trained based on deep convolutional neural networks.

In one or more embodiments, robust detector training module 110 includes mask module 116. Mask module 116 is configured to mask defect objects that are detected by object detector 114 from input images 102. In an example, mask module 116 may generate patches to cover defect objects detected in input images 102. Robust detector training module 110 may save input images 102 as masked images 118 after mask module 116 masks defect objects that are detected by object detector 114 from input images 102. Robust detector training module 110 may input masked images 118 to train robust detector 124 for improving the performance and accuracy of robust detector 124. In an example, each of masked images 118 have at least one defect object as the training images for robust detector 124.

In one or more embodiments, robust detector training module 110 includes annotation module 120. Annotation module 120 may annotate defect objects that are detected by object detector 114 from input images 102. In an example, annotation module 116 may generate bounding boxes to indicate the areas of the detected defect objects in input images 102. Robust detector training module 110 may save input images 102 as annotated images 122 after annotation module 120 annotate defect objects that are detected by object detector 114 from input images 102. Robust detector training module 110 may input annotated images 122 to train robust detector 124 for improving the performance and accuracy of robust detector 124. In an example, annotated images 122 have at least one defect object as the training images for robust detector 124.

Figure 2:
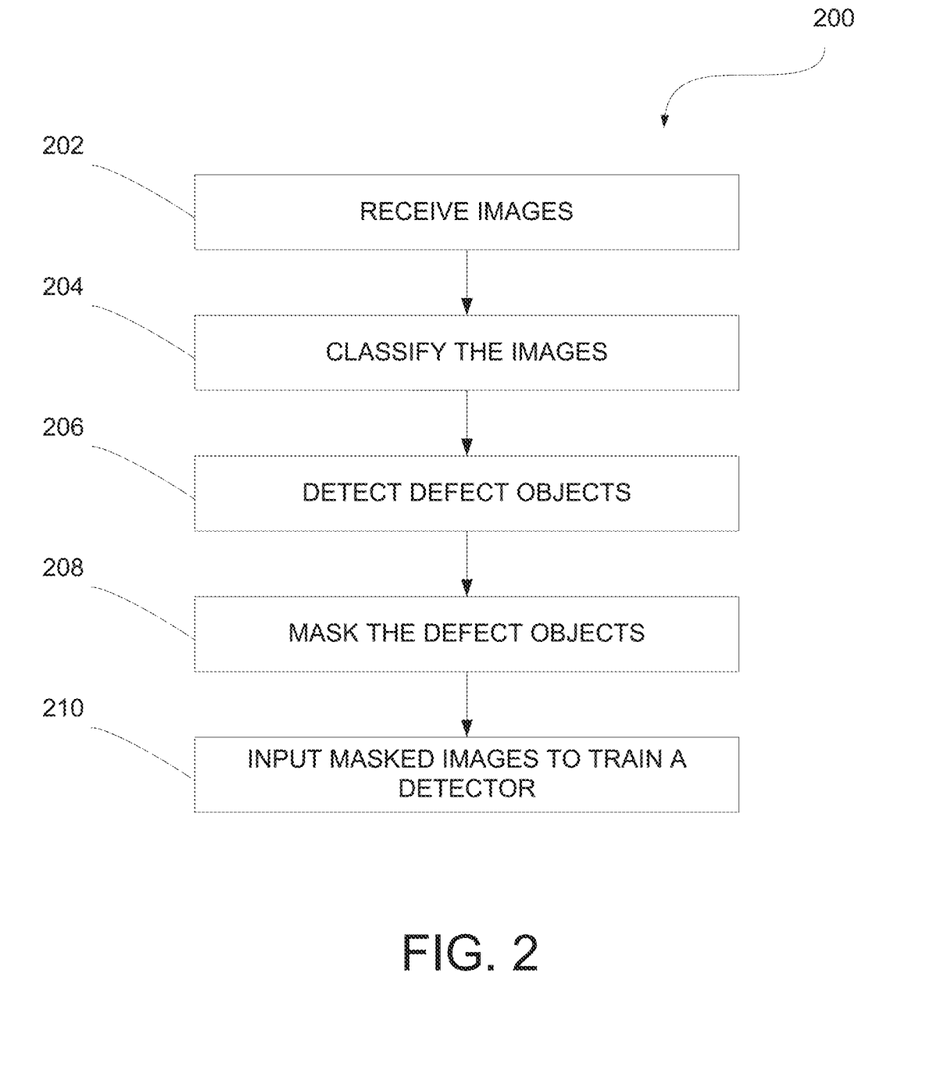
FIG. 2 is a flowchart depicting operational steps of a robust detector training module within a computing device of FIG. 1, in accordance with an embodiment of the present disclosure.

FIG. 2 is a flowchart 200 depicting operational steps of robust detector training module 110 in accordance with an embodiment of the present disclosure.

Robust detector training module 110 operates to receive input images 102 for visual inspection to train robust detector 124 for improving the performance and accuracy of robust detector 124. Robust detector training module 110 also operates to classify input images as good or not-good images using classifier 112. A good image means no defect object in the image. A not-good image means one or more defect objects are in the image. In response to classifying input images 102 as not-good images, robust detector training module 110 operates to detect defect objects in the not-good images. Robust detector training module 110 operates to mask the defect objects in the not-good images. Robust detector training module 110 operates to input the masked images to train robust detector 124.

In step 202, robust detector training module 110 receives input images 102 to train robust detector 124. In an example, input images 102 are images taken for an industrial quality inspection, for example, for a product quality inspection. Input images 102 may be labeled in image-level to indicate input images 102 are good or not-good images. In an example, labelling input images 102 in image-level means that input images 102 are simply labelled as good or not-good images without annotating objects in input images 102. A good image means there is no defect object in the image from the visual inspection. A not-good image means one or more defect objects are in the image from the visual inspection. A not-good image may include one or more bounding boxes (e.g., annotations) to indicate the locations of the one or more defect objects. In an example, every defect object in the not-good image has a corresponding bounding box to indicate the location of the defect object. In another example, there is no bounding box marked for any defect object in the not-good image. In yet another example, some bounding boxes are marked for some defect objects, but some bounding boxes are missed for some other defect objects in the not-good image.

In step 204, robust detector training module 110 classifies input images 102 as being good or not-good images by classifier 112. A good image means there is no defect object in the image from the visual inspection. A not-good image means one or more defect objects are in the image from the visual inspection. In an example, robust detector training module 110 is configured to train classifier 112 for classifying an image to be a good or not-good (i.e., with one or more defect objects) image. For example, initial training samples may include negative sample and position samples. Training samples can be augmented with mask with random number and size of pads with similar distribution of annotation boxes. Training samples may add pads with a least one defect object that is visible. In another example, classifier 112 is a pre-trained classifier that may classify an image to be a good or not-good (i.e., with one or more defect objects) image. Classifier 112 may be trained by using neural network techniques. Classifier 112 may be trained by using deep convolutional neural networks.

In step 206, robust detector training module 110 detects defect objects in a not-good image that is classified by classifier 112. Robust detector training module 110 detects the defect objects by object detector 114. In an example, object detector 114 is a pre-trained object detector that may detect defect objects in a not-good image that is classified by classifier 112. In another example, robust detector training module 110 is configured to train object detector 114 for detecting defect objects in a not-good image that is classified by classifier 112. In an example, object detector 114 may be trained with weakly supervised learning methods with image-level annotations. In another example, object detector 114 may be trained with machine learning-based approaches. In yet another example, object detector 114 may be trained based on deep convolutional neural networks.

In step 208, robust detector training module 110 masks the detected defect objects in input images 102. In an example, mask module 116 may generate patches to cover defect objects detected in input images 102. Robust detector training module 110 may save input images 102 into masked images 118 after mask module 116 masks defect objects that are detected by object detector 114 from input images 102. In another example, robust detector training module 110 may annotate defect objects that are detected by object detector 114 from input images 102. Robust detector training module 110 may generate bounding boxes to indicate the areas of the detected defect objects in input images 102. Robust detector training module 110 may save input images 102 into annotated images 122 after robust detector training module 110 annotates defect objects that are detected by object detector 114 from input images 102. Robust detector training module 110 may input annotated images 118 to train robust detector 124.

In step 210, robust detector training module 110 inputs masked images 118 to train robust detector 124. In an example, masked images 118 may have at least one defect object as the training images for robust detector 124. In another example, robust detector training module 110 may input annotated images 122 to train robust detector 124. In an example, annotated images 122 have at least one defect object as in the training images for robust detector 124. In yet another example, robust detector training module 110 may input a good image classified by classifier 112 to train robust detector 124. In yet another example, robust detector training module 110 may input both masked images 118 and or annotated images 122 to train robust detector 124.

Figure 3:
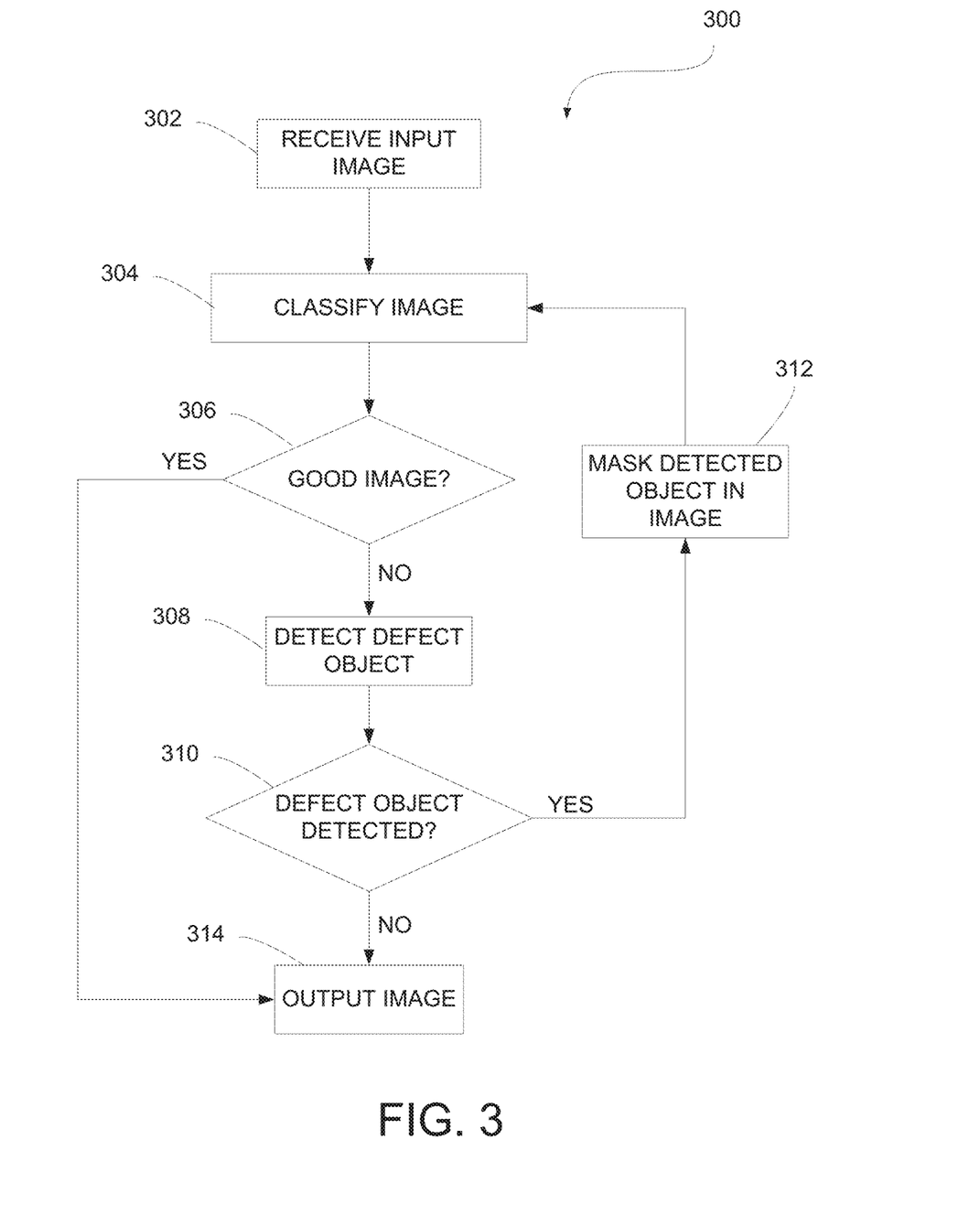
FIG. 3 is a flowchart depicting operational steps of the robust detector training module within the computing device of FIG. 1, in accordance with an embodiment of the present disclosure.

FIG. 3 is a flowchart 300 depicting operational steps of robust detector training module 110 in accordance with an embodiment of the present disclosure.

Robust detector training module 110 operates to receive input images 102. Robust detector training module 110 also operates to classify input images 102 as good or not-good images using classifier 112. A good image means no defect object in the image. A not-good image means one or more defect objects are in the image. In response to classifying input images 102 as not-good images, robust detector training module 110 operates to detect defect objects in the not-good images. Robust detector training module 110 operates to mask the defect objects in the not-good images. Robust detector training module 110 operates to iterate to input the masked images to classifier 112 until the masked images are classified as good images by classifier 112. Robust detector training module 110 operates to output the masked images after the masked images are classified as good images by classifier 112 or no defect object is found in the masked images. Robust detector training module 110 operates to output the masked images after all defect objects in input images 102 are detected by object detector 114.

In step 302, robust detector training module 110 receives input images 102. In an example, input images 102 are images taken for an industrial quality inspection, for example, for a product quality inspection. Input images 102 may be labeled in image-level to indicate input images 102 are good or not-good images. A good image means there is no defect object in the image from the visual inspection. A not-good image means one or more defect objects are in the image from the visual inspection. A not-good image may include one or more bounding boxes (e.g., annotations) to indicate the locations of the one or more defect objects. In an example, every defect object in the not-good image has a corresponding bounding box to indicate the location of the defect object. In another example, there is no bounding box marked for any defect object in the not-good image. In yet another example, some bounding boxes are missed for some defect objects in the not-good image.

In step 304, robust detector training module 110 classifies input images 102 as being good or not-good images by classifier 112. A good image means there is no defect object in the image from the visual inspection. A not-good image means one or more defect objects are in the image from the visual inspection. If classifier 112 determines an image to classify is a good image (decision 306, "YES" branch), robust detector training module 110 outputs the image in step 314. Robust detector training module may use the output image as a training image for robust detector 124 as discussed above in FIGS. 1 and 2. If classifier 112 determines the input image to classifier 112 is not a good image (decision 306, "NO" branch), robust detector training module 110 moves on to step 308.

In step 308, robust detector training module 110 detects the defect objects by object detector 114. In an example, object detector 114 is a pre-trained object detector that may detect defect objects in a not-good image that is classified by classifier 112. In another example, robust detector training module 110 is configured to train object detector 114 for detecting defect objects in a not-good image that is classified by classifier 112. In an example, object detector 114 may be trained with weakly supervised learning methods with image-level annotations. In another example, object detector 114 may be trained with machine learning-based approaches. In yet another example, object detector 114 may be trained based on deep convolutional neural networks.

If object detector 114 detects a defect object in the image (decision 310, "YES" branch), robust detector training module 110 masks the detected defect object in the image in step 312. In an example, mask module 116 may generate a patch to cover the detected defect object in the image. Robust detector training module 110 may save the masked image and enter the masked image as an input image to classifier 112 in step 304. If object detector 114 detects no defect object from the input image (decision 310, "NO" branch), robust detector training module 110 moves on to output the image in step 314. Robust detector training module may use the output image as a training image for robust detector 124 as discussed above in FIGS. 1 and 2.

Figure 4:
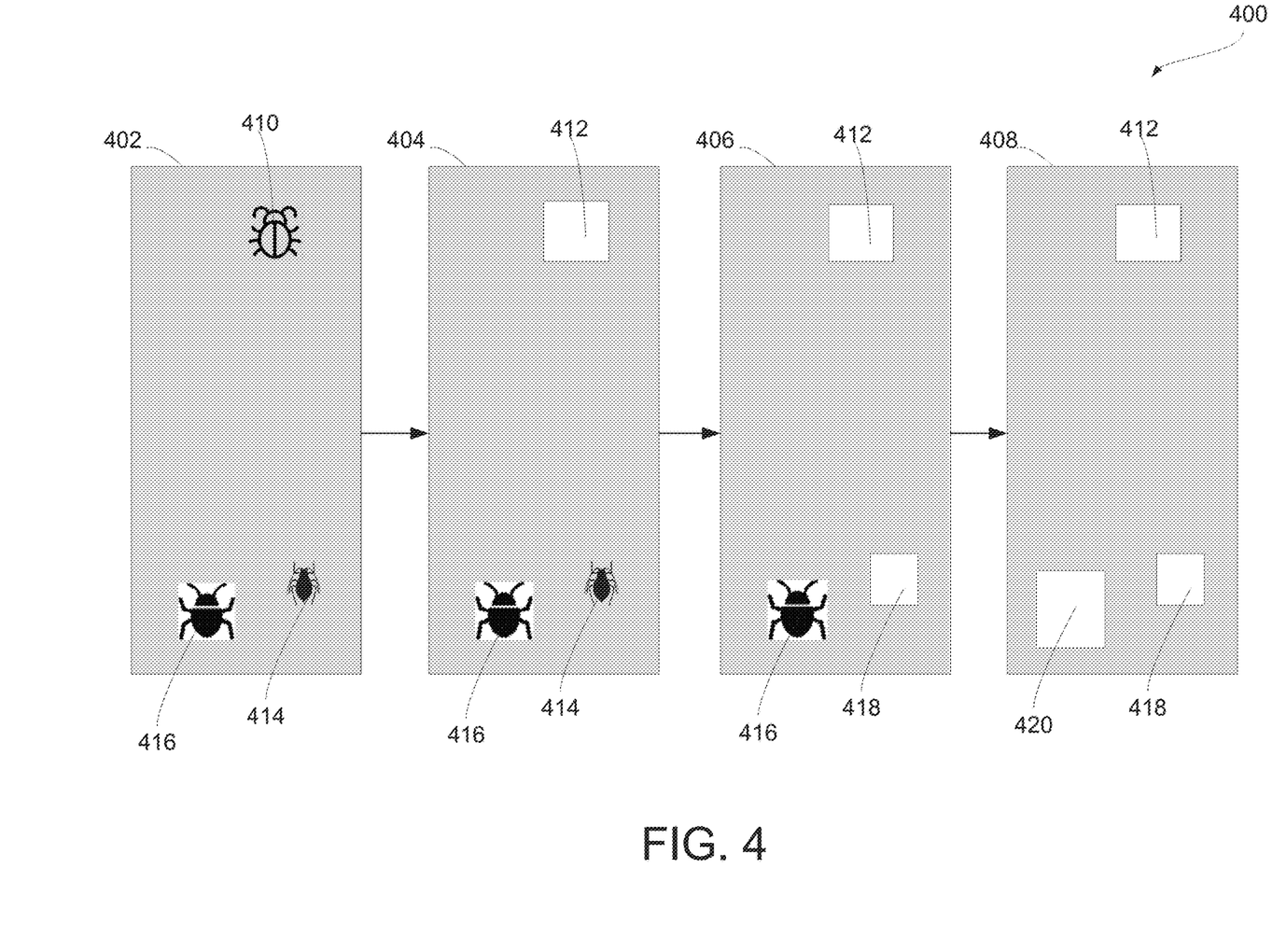
FIG. 4 illustrates an example object detection and masking process of the robust detector training module within the computing device of FIG. 1, in accordance with an embodiment of the present disclosure.

FIG. 4 illustrates an example object detection and masking process of robust detector training module 110 in accordance with an embodiment of the present disclosure.

In the example of FIG. 4, image 402 illustrates a picture taken for visual inspection, for example, for a product quality inspection. Image 402 has three defect objects demonstrated as first defect object 410, second defect object 414, and third defect object 416. Annotations including bounding boxes are missed in all three defect objects 410, 414, 416. In an example, image 402 is labeled as a not-good image in image level as defect objects are shown in image 402. In another example, image 402 is not labeled as a good or not-good image in image level.

Robust detector training module 110 receives image 402 for preparing a training image to train robust detector 124.

Robust detector training module 110 classifies image 402 as a not-good image via classifier 112. Robust detector training module 110 detects first defect object 410 via object detector 114. Robust detector training module 110 generates first patch 412 and masks first defect object 410 by covering first defect object 410 with first patch 412. Robust detector training module 110 may save first masked image 404. Robust detector training module 110 sends first masked image 404 to classifier 112 to classify first masked image 404.

Robust detector training module 110 classifies first masked image 404 as a not-good image via classifier 112. Robust detector training module 110 detects second defect object 414 via object detector 114. Robust detector training module 110 generates second patch 418 and masks second defect object 414 by covering second defect object 414 with second patch 418. Robust detector training module 110 may save second masked image 406. Robust detector training module 110 sends second masked image 406 to classifier 112 to classify second masked image 406.

Robust detector training module 110 classifies second masked image 406 as a not-good image via classifier 112. Robust detector training module 110 detects third defect object 416 via object detector 114. Robust detector training module 110 generates third patch 420 and masks third defect object 416 by covering third defect object 416 with third patch 420. Robust detector training module 110 may save third masked image 408. Robust detector training module 110 sends third masked image 408 to classifier 112 to classify third masked image 408.

Robust detector training module 110 classifies third masked image 408 as a good image via classifier 112 because all defect objects 410, 414, 416 are covered with patches 412, 418, 420 and are deemed as no defect object in third masked image 408. Robust detector training module 110 may output third masked image 408 as an input image to train robust detector 124. In an example, robust detector training module 110 may add bounding boxes (e.g., pseudo annotations) over one or more defect objects 410, 414, 416 in third masked image 408. Robust detector training module 110 may save and send third masked image 408 with the added bounding boxes as an input image to train robust detector 124.

Figure 5:
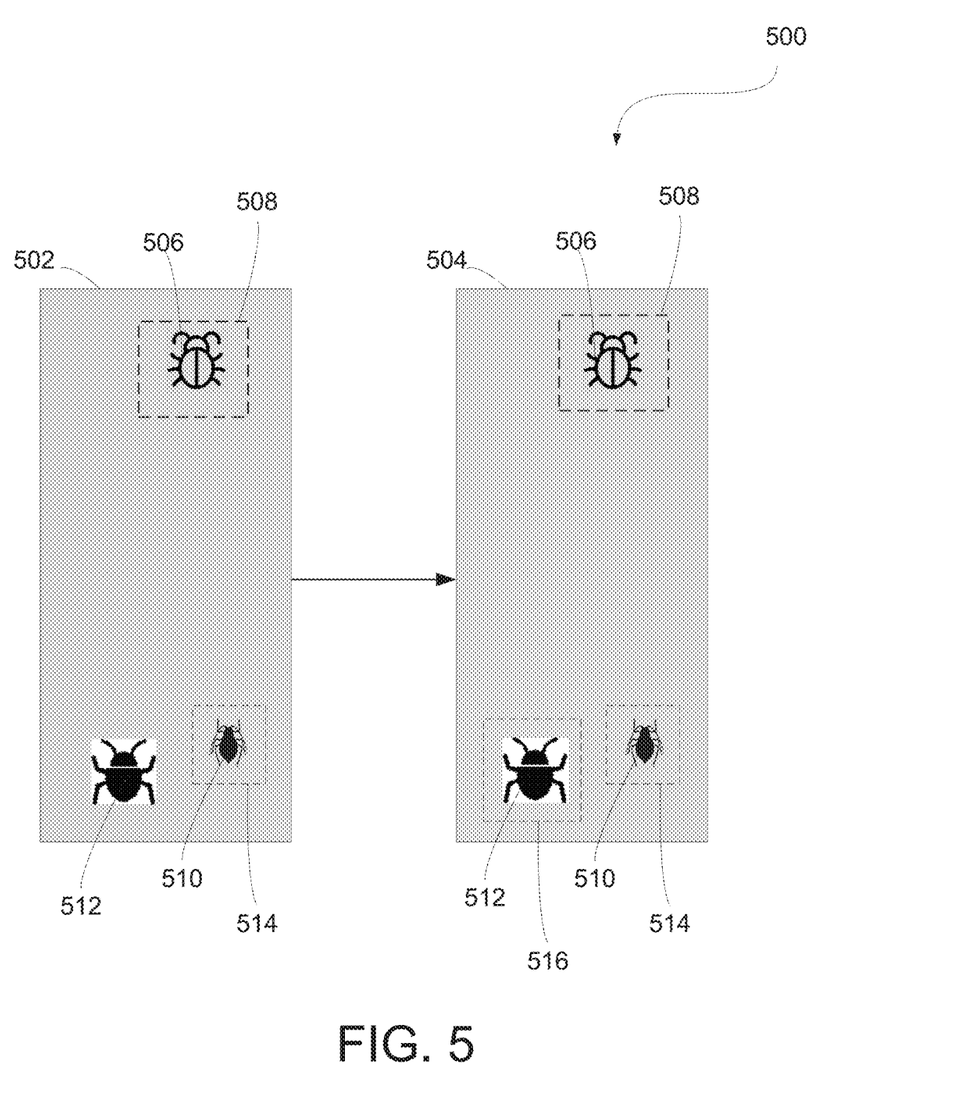
FIG. 5 illustrates an example object detection and annotating process of the robust detector training module within the computing device of FIG. 1, in accordance with an embodiment of the present disclosure.

FIG. 5 illustrates an example object detection and annotating process of robust detector training module 110 in accordance with an embodiment of the present disclosure.

In the example of FIG. 5, image 502 illustrates a picture taken for visual inspection, for example, for a product quality inspection. Image 502 has three defect objects demonstrated as first defect object 506, second defect object 510, third defect object 512. First defect object 506 and second defect object 510 are marked and annotated with first bounding box 508 and second bounding box 514. However, a bounding box or an annotation is missed for third defect object 512.

Robust detector training module 110 receives image 502 for preparing a training image to train robust detector 124. Robust detector training module 110 may cover or erase known defect objects of first defect object 506 and second defect object 510 in image 502 as first defect object 506 and second defect object 510 are already marked and annotated with bounding boxes 508, 514. Robust detector training module 110 classifies image 502 as a not-good image via classifier 112. Robust detector training module 110 detects third defect object 512 via object detector 114. Robust detector training module 110 adds bounding box 516 over third defect object 512 in image 502 and saves it as image

504. Robust detector training module 110 may send image 504 having bounding box 516 as an input image to train robust detector 124. Robust detector training module 110 may restore bounding boxes 508, 514 for defect objects 506, 510. In another example, robust detector training module 110 may restore bounding boxes 508, 514 for defect objects 506, 510 and send image 504 having bounding box 516 as an input image to train robust detector 124.

Figure 6:
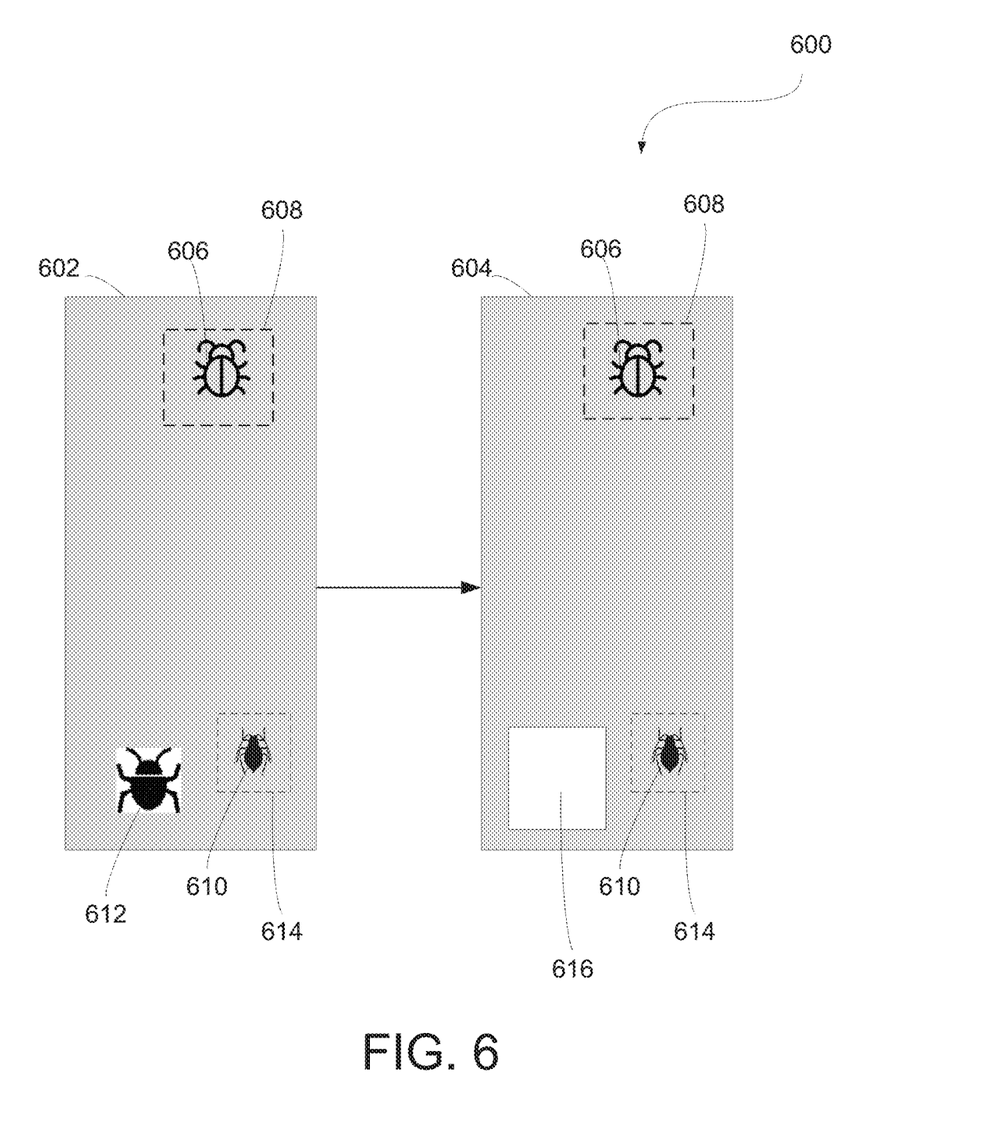
FIG. 6 illustrates another example object detection and masking process of the robust detector training module within the computing device of FIG. 1, in accordance with an embodiment of the present disclosure.

FIG. 6 illustrates an example object detection and masking process of robust detector training module 110 in accordance with an embodiment of the present disclosure.

In the example of FIG. 6, image 602 illustrates a picture taken for visual inspection, for example, for a product quality inspection. Image 602 has three defect objects demonstrated as first defect object 606, second defect object 610, third defect object 612. First defect object 606 and second defect object 610 are marked and annotated with first bounding box 608 and second bounding box 614. However, a bounding box or an annotation is missed for third defect object 612.

Robust detector training module 110 receives image 602 for preparing a training image to train robust detector 124. Robust detector training module 110 may cover or erase known defect objects of first defect object 606 and second defect object 610 in image 602 as first defect object 606 and second defect object 610 are already marked and annotated with bounding boxes 608, 614. Robust detector training module 110 classifies image 602 as a not-good image via classifier 112. Robust detector training module 110 detects third defect object 612 via object detector 114. Robust detector training module 110 generates patch 616 over third defect object 612 in image 602 and saves it as image 604. Robust detector training module 110 may send image 604 having patch 616 as an input image to train robust detector 124. In another example, robust detector training module 110 may restore bounding boxes 608, 614 for defect objects 606, 610 and send image 604 having patch 616 as an input image to train robust detector 124.

Figure 7:
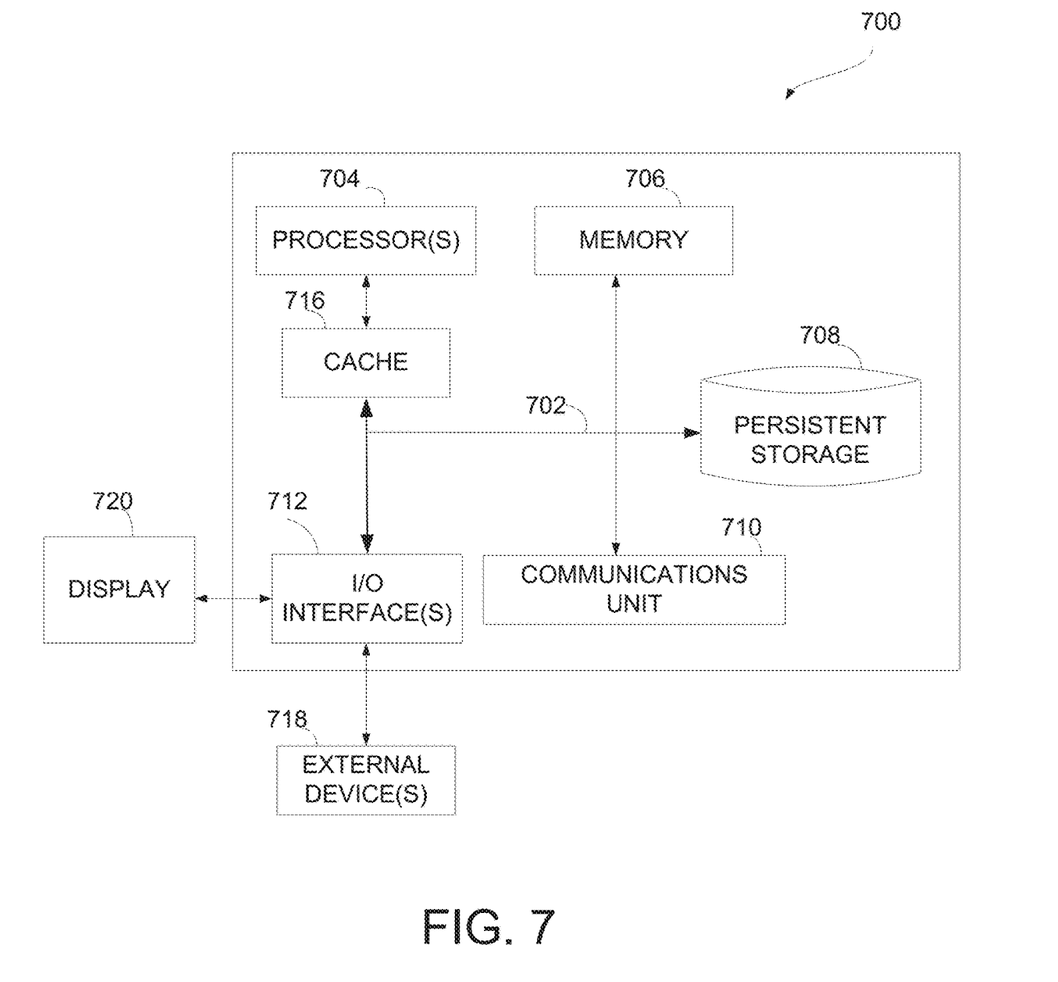
FIG. 7 is a block diagram of components of the computing device of FIG. 1, in accordance with an embodiment of the present disclosure.

FIG. 7 depicts a block diagram 700 of components of computing device 104 in accordance with an illustrative embodiment of the present disclosure. It should be appreciated that FIG. 7 provides only an illustration of one implementation and does not imply any limitations with regard to the environments in which different embodiments may be implemented. Many modifications to the depicted environment may be made.

Computing device 104 may include communications fabric 702, which provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Robust detector training module 110 may be stored in persistent storage 708 and in memory 706 for execution by one or more of the respective computer processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Robust detector training module 110 may be downloaded to persistent storage 708 through communications unit 710.

I/O interface(s) 712 allows for input and output of data with other devices that may be connected to computing device 104. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., robust detector training module 110 can be stored on such portable computer readable storage media and can be loaded onto persistent storage 708 via I/O interface(s) 712. I/O interface(s) 712 also connect to display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:
1. A computer-implemented method comprising:
   receiving, by one or more processors, a first image under visual inspection;

classifying, by one or more processors, the first image being a not-good image using a pre-trained classifier, the not-good image having at least a defect object;
in response to classifying the first image being the not-good image, detecting, by one or more processors, one or more defect objects in the not-good image;
masking, by one or more processors, the one or more defect objects in the not-good image with one or more bounding boxes indicating areas of the one or more defect objects in the image;
annotating, by one or more processors, the one or more defect objects;
inputting, by one or more processors, the masked image to train a detector, wherein the masked image includes the one or more bounding boxes generated for one or more bounding objects and saved for the masked image;
inputting, by one or more processors, the annotated image to train the detector;
receiving, by one or more processors, a second image under visual inspection;
classifying, by one or more processors, the second image being a good image using a pre-trained classifier, the good image meaning no defect object being in the second image;
inputting, by one or more processors, the good image to train the detector;
receiving, by one or more processors, a third image under visual inspection;
classifying, by one or more processors, the third image being the not-good image using the pre-trained classifier;
detecting, by one or more processors, the not-good image having no defect object; and
inputting, by one or more processors, the not-good image to train the detector.

2. The computer-implemented method of claim 1, wherein the one or more defect objects include a defect object that has no bounding box indicating an area of the defect object.

3. The computer-implemented method of claim 1, wherein masking the one or more defect objects includes using one or more patches to cover the one or more defect objects in the image.

4. The computer-implemented method of claim 1, wherein masking the one or more defect objects includes generating bounding boxes indicating areas of the one or more defect objects in the image.

5. The computer-implemented method of claim 1, further comprising:
receiving, by one or more processors, a plurality of images under the visual inspection;
classifying, by one or more processors, each of the plurality of images being not-good image using a pre-trained classifier, the not-good image meaning one or more defect objects being in the image;
in response to classifying one or more of the plurality of images being the not-good images, detecting, by one or more processors, the one or more defect objects in each of the not-good images;
masking, by one or more processors, the one or more defect objects in each of the not-good images; and
inputting, by one or more processors, each masked image to train the detector.

6. A computer program product comprising:
one or more computer readable storage media, and program instructions collectively stored on the one or more computer readable storage media, the program instructions comprising:
program instructions to receive an image under visual inspection;
program instructions to classify the image being a not-good image using a pre-trained classifier, the not-good image having at least a defect object;
program instructions to, in response to classifying the image being the not-good image, detect the one or more defect objects in the not-good image;
program instructions to mask the one or more defect objects in the not-good image with one or more bounding boxes indicating areas of the one or more defect objects in the image;
program instructions to annotate the one or more defect objects;
program instructions to input the masked image to train a detector, wherein the masked image includes the one or more bounding boxes generated for one or more bounding objects and saved for the masked image;
program instructions to input the annotated image to train the detector;
program instructions to receive a second image under visual inspection;
program instructions to classify the second image being a good image using a pre-trained classifier, the good image meaning no defect object being in the second image;
program instructions to input the good image to train the detector;
program instructions to receive a third image under visual inspection;
program instructions to classify the third image being the not-good image using the pre-trained classifier;
program instructions to detect the not-good image having no defect object and
program instructions to input the not-good image to train the detector.

7. The computer program product of claim 6, wherein the one or more defect objects include a defect object that is pre-marked with a bounding box indicating an area of the defect object.

8. The computer program product of claim 7, wherein program instructions to mask the one or more defect objects include program instructions to restore the pre-marked bounding box for the defect object.

9. The computer program product of claim 6, wherein the one or more defect objects include a defect object that has no bounding box indicating an area of the defect object.

10. The computer program product of claim 6, wherein program instructions to mask the one or more defect objects include program instructions to use one or more patches to cover the one or more defect objects in the image.

11. The computer program product of claim 6, further comprising:
program instructions to receive a plurality of images under the visual inspection;
program instructions to classify each of the plurality of images being a not-good image using a pre-trained classifier, the not-good image meaning one or more defect objects being in the image;

program instructions to, in response to classifying one or more of the plurality of images being the not-good images, detect the one or more defect objects in each of the not-good images;
program instructions to mask the one or more defect objects in each of the not-good images; and
program instructions to input each masked image to train the detector.

12. A computer system comprising:
one or more computer processors, one or more computer readable storage media, and program instructions stored on the one or more computer readable storage media for execution by at least one of the one or more computer processors, the program instructions comprising:
program instructions to receive an image under visual inspection;
program instructions to classify the image being a not-good image using a pre-trained classifier, the not-good image having at least a defect object;
program instructions to, in response to classifying the image being the not-good image, detect the one or more defect objects in the not-good image;
program instructions to mask the one or more defect objects in the not-good image with one or more bounding boxes indicating areas of the one or more defect objects in the image;
program instructions to annotate the one or more defect objects;
program instructions to input the masked image to train a detector, wherein the masked image includes the one or more bounding boxes generated for one or more bounding objects and saved for the masked image;
program instructions to input the annotated image to train the detector;
program instructions to receive a second image under visual inspection;
program instructions to classify the second image being a good image using a pre-trained classifier, the good image meaning no defect object being in the second image;
program instructions to input the good image to train the detector;
program instructions to receive a third image under visual inspection;
program instructions to classify the third image being the not-good image using the pre-trained classifier;
program instructions to detect the not-good image having no defect object and
program instructions to input the not-good image to train the detector.

13. The computer system of claim 12, wherein the one or more defect objects include a defect object that is pre-marked with a bounding box indicating an area of the defect object.

14. The computer system of claim 13, wherein program instructions to mask the one or more defect objects include program instructions to restore the pre-marked bounding box for the defect object.

15. The computer system of claim 12, wherein the one or more defect objects include a defect object that has no bounding box indicating an area of the defect object.

16. The computer system of claim 12, wherein program instructions to mask the one or more defect objects include program instructions to generate bounding boxes indicating areas of the one or more defect objects in the image.

17. The computer system of claim 12, further comprising:
program instructions to receive a plurality of images under the visual inspection;
program instructions to classify each of the plurality of images being a not-good image using a pre-trained classifier, the not-good image meaning one or more defect objects being in the image;
program instructions to, in response to classifying one or more of the plurality of images being the not-good images, detect the one or more defect objects in each of the not-good images;
program instructions to mask the one or more defect objects in each of the not-good images; and
program instructions to input each masked image to train the detector.

* * * * *